United States Patent
Hubert et al.

(10) Patent No.: US 11,421,739 B2
(45) Date of Patent: Aug. 23, 2022

(54) REDUCED FRICTION CONDUCTIVE ASSEMBLY FOR BEARINGS

(71) Applicant: AKTIEBOLAGET SKF, Gothenburg (SE)

(72) Inventors: Mathieu Hubert, Turin (IT); Gene A. Kovacs, Brighton, MI (US); David Christopher Rybski, White Lake, MI (US)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 17/184,086

(22) Filed: Feb. 24, 2021

(65) Prior Publication Data

US 2021/0293279 A1    Sep. 23, 2021

(30) Foreign Application Priority Data

Mar. 17, 2020    (IT) .................. 102020000005578

(51) Int. Cl.
*F16C 41/00* (2006.01)
*H01R 39/64* (2006.01)

(52) U.S. Cl.
CPC .......... *F16C 41/002* (2013.01); *H01R 39/643* (2013.01)

(58) Field of Classification Search
CPC ....... F16C 41/002; H02K 11/40; H02K 5/145; H02K 13/10; H01R 4/64; H01R 39/385; H01R 39/39; H01R 39/643
See application file for complete search history.

(56) References Cited

U.S. PATENT DOCUMENTS

| | | | |
|---|---|---|---|
| 3,757,164 A | 9/1973 | Binkowski | |
| 4,801,270 A * | 1/1989 | Scarlata | F16C 41/002 439/95 |
| 9,790,995 B2 * | 10/2017 | White | F16C 41/002 |
| 10,253,818 B1 * | 4/2019 | Ince | F16C 33/7843 |
| 10,931,179 B2 | 2/2021 | Hubert et al. | |
| 2006/0007609 A1 * | 1/2006 | Oh | H02K 11/40 361/23 |
| 2019/0296617 A1 | 9/2019 | Hubert et al. | |
| 2020/0072288 A1 | 3/2020 | Roman | |

OTHER PUBLICATIONS

English-language Search Report and Written Opinion from the Italian Patent Office dated Dec. 11, 2020 in related application No. 102020000005578.

* cited by examiner

*Primary Examiner* — Alan B Waits
(74) *Attorney, Agent, or Firm* — J-Tek Law PLLC; Scott T. Wakeman; Mark A. Ussai (57) ABSTRACT

An electrically conductive assembly is for a bearing disposed about a shaft and disposed within a housing. The conductive assembly includes an annular retainer coupleable with a bearing outer ring or with the bearing housing and having a centerline and an open inner end defining an annular groove. At least two and preferably several conductors each have a radially outer end disposed within the retainer groove and a radially inner end contactable with the shaft. Each conductor is formed of a plurality of conductive fibers arranged to extend radially inwardly from the retainer inner end. The at least two conductors are spaced apart circumferentially about the centerline so as to define at least two axial passages between the retainer and the shaft. Preferably, the conductors are separated by spacers formed of conductive fibers each having a length shorter than the length of the fibers of the conductors.

19 Claims, 7 Drawing Sheets

REDUCED FRICTION CONDUCTIVE ASSEMBLY FOR BEARINGS

CROSS-REFERENCE

This application claims priority to Italian Patent Application No. 102020000005578, filed Mar. 17, 2020 the entire contents of which are fully incorporated herein by reference.

BACKGROUND OF THE INVENTION

The present invention relates to bearings, and more particularly to grounding devices for preventing electric current or charge from passing through a bearing.

Bearings used in electrical machinery, such as motors, generators and similar devices, may be damaged if electric current or charge passes through the bearing, which is particularly harmful to the bearing raceways. Devices such as grounding brushes have been developed to provide an alternative path for current and thereby prevent such current from passing through the bearing. These devices often include a plurality of conductive fibers spaced circumferentially about the entire outer surface of the shaft to form a relatively solid ring of fibers, such that current passes through the fibers between the shaft and the housing. However, the friction between such rings of conductive fibers and the shaft surface is relatively substantial and results in excessive heat being generated within the electrical machine.

SUMMARY OF THE INVENTION

In one aspect, the present invention is an electrically conductive assembly for a bearing disposed about a shaft and disposed within a housing, the bearing including inner and outer rings and plurality of rolling elements disposed between the rings. The conductive assembly comprises an annular retainer coupleable with the bearing outer ring or with the bearing housing and having a centerline and an open inner end defining an annular groove. At least two conductors each have a radially outer end disposed within the retainer groove and a radially inner end contactable with the shaft. Each conductor is formed of a plurality of conductive fibers arranged to extend radially inwardly from the retainer inner end. The at least two conductors are spaced apart circumferentially about the centerline so as to define at least two axial passages between the retainer and the shaft.

In another aspect, the present invention is again an electrically conductive assembly for a bearing disposed about a shaft and disposed within a housing, the bearing including inner and outer rings and plurality of rolling elements disposed between the rings. The conductive assembly comprises an annular retainer coupleable with the bearing outer ring or with the bearing housing and having a centerline and an open inner end defining an annular groove. At least two sets of first conductive fibers and two sets of second conductive fibers are spaced alternately and circumferentially about the retainer centerline such that each set of the second conductive fibers is disposed between two sets of the first conductive fibers. Each first conductive fiber extends radially inwardly from the retainer groove, has a first radial length and is contactable with the shaft outer surface. Each second conductive fiber extends radially inwardly from the retainer groove and has a second radial length substantially lesser than the first radial length such that an arcuate axial passage is defined radially between each one of the sets of the second fibers and the shaft outer surface.

In yet another aspect, the present invention is a method of forming a conductive assembly for a bearing disposed about a shaft and disposed within a housing. The method comprises the steps of: providing a plurality of conductive fibers each having opposing ends and a first length between the ends, a length of metal wire, and an elongated rectangular strip of metallic material having a length, an upper surface and two longitudinal edges; positioning the plurality of conductive fibers upon the upper surface of the strip such that the ends of each fiber extend outwardly of the edges of the strip and the plurality of fibers is distributed along the length of the strip; placing the wire upon the distributed plurality of conductive fibers such that wire extends centrally along the length of the strip; bending each one of the two longitudinal edges of the metal strip toward the other longitudinal edge so as to form two spaced apart legs, the two legs defining a groove and retaining the wire and plurality of fibers within the groove, and to cause each one of the conductive fibers to bend about the wire such that the two ends of each fiber are adjacent to each other; forming the strip and the wire into an annular body with a centerline such the plurality of fibers extend radially toward a centerline; and cutting a plurality of separate portions of the fibers such that the fibers of each cut portion have a second length lesser than the first length, each cut portion of the fibers defining a separate axial passage when the annular body is disposed about a shaft.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings:

FIGS. 10A and 10B, collectively FIG. 10, are each an axial cross-sectional view of a portion of conductive assembly, FIG. 10A showing separate conductive fibers and FIG. 10B showing conductive fibers clustered by protective sheaths;

DETAILED DESCRIPTION OF THE INVENTION

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Figure 4:
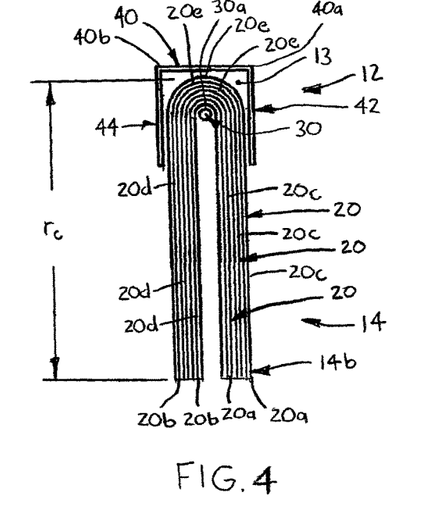
FIG. 4 is a view through line 4-4 of FIG. 3.
Figure 5:
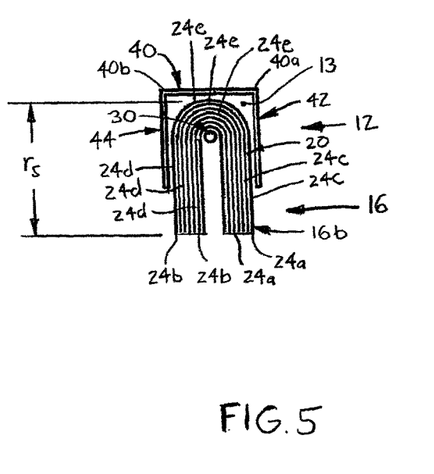
FIG. 5 is a view through line 5-5 of FIG. 3.
Figure 6:
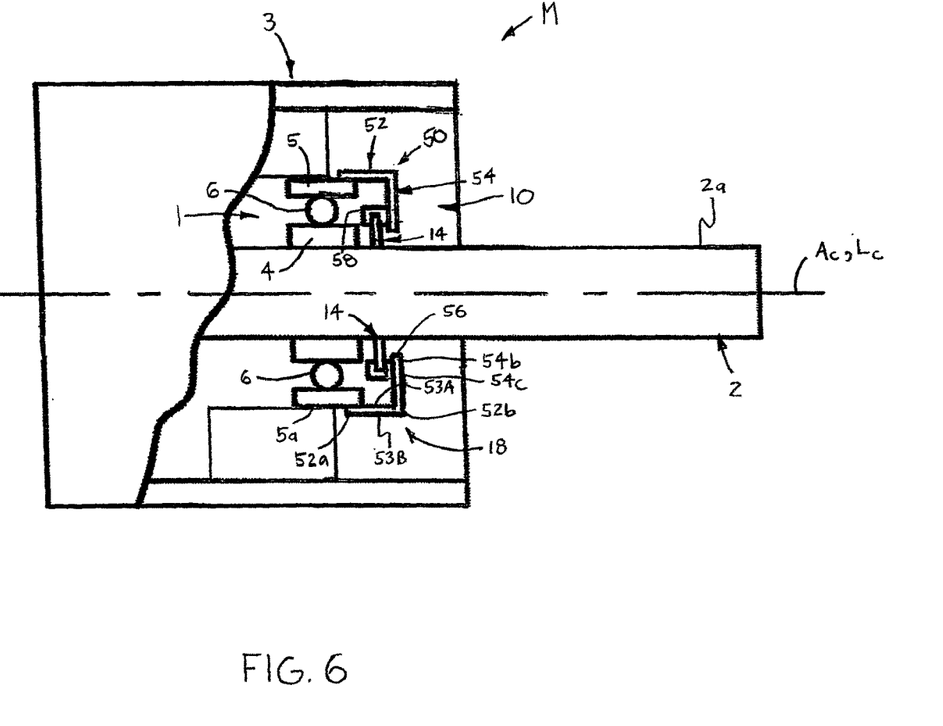
FIG. 6 is another partly broken-away, axial cross-sectional view of the conductive assembly, shown engaged with the shaft of a machine and mounted to a bearing.
Figure 7:
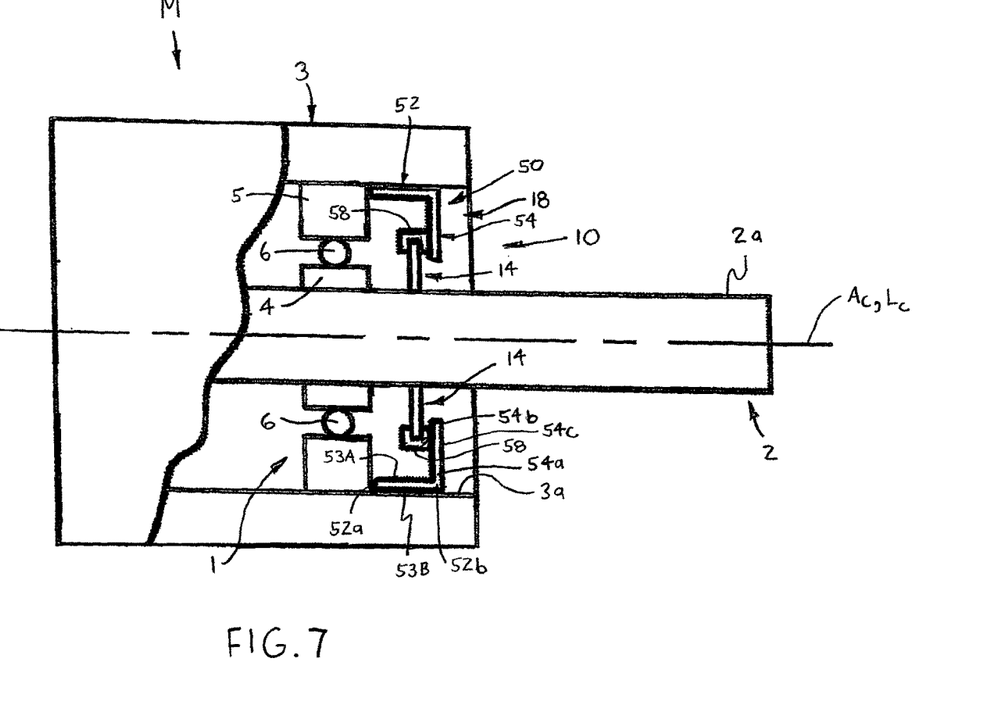
FIG. 7 is a partly broken-away, axial cross-sectional view of the conductive assembly, shown engaged with a shaft of a machine and mounted within a housing.
Figure 8:
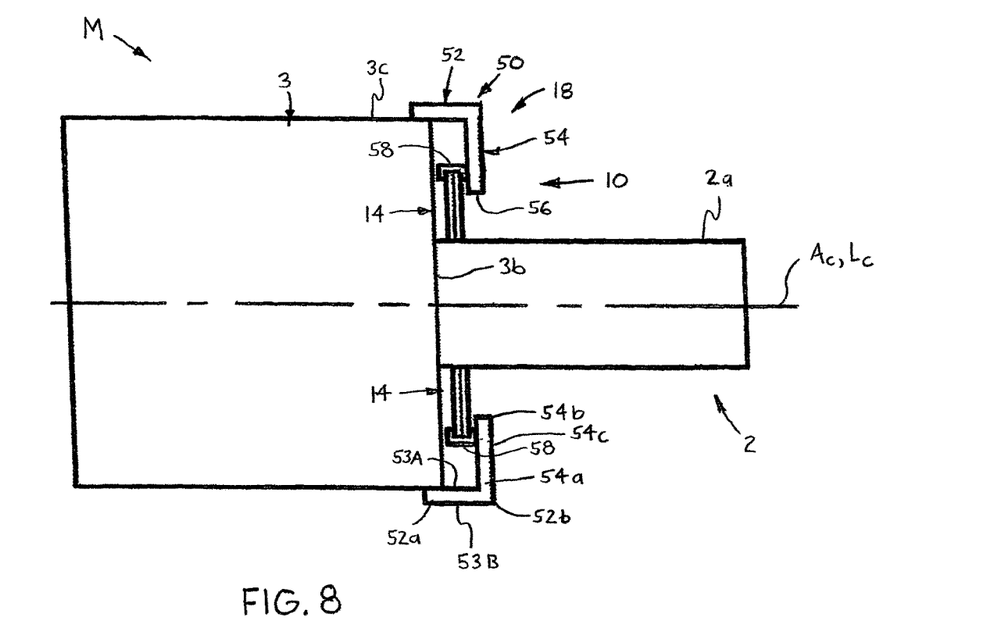
FIG. 8 another partly broken-away, axial cross-sectional view of the conductive assembly, shown engaged with a shaft of a machine and mounted about an end of a housing.

Referring now to the drawings in detail, wherein like numbers are used to indicate like elements throughout, there is shown in FIGS. 1-12 an electrically conductive assembly 10 for a bearing 1 disposed about a shaft 2 rotatable about a central axis $A_C$ and disposed within a housing 3. The bearing 1, the shaft 2 and the housing 3 are preferably components of a motor or other electrical machine M (e.g., a generator) or any other machine having rotating components likely to accumulate electric charge or convey electric current, as depicted in FIGS. 6-8. The conductive assembly 10 or "grounding brush" is preferably used with a rolling element bearing 1 that includes inner and outer rings 4, 5, respectively, and plurality of rolling elements 6 disposed between the rings 4, 5. Basically, the conductive assembly 10 comprises an annular retainer 12 and at least two arcuate conductors 14 extending radially inwardly from the retainer 12, and preferably also comprises at least two arcuate spacers 16 for separating the conductors 14 and a case 18 for coupling the assembly 10 with the bearing 1 or directly with the housing 3.

More specifically, the annular retainer 12 is fabricated of an electrically conductive material, preferably aluminum, is coupleable with the bearing outer ring 5 or with the bearing housing 3 (i.e., preferably through the case 18). The retainer 12 has a centerline $L_C$, an open inner end 12a defining an annular groove 13, and a closed outer end 12b. Each of the conductors 14 has a radially outer end 14a disposed within the retainer groove 13 and a radially inner end 14b contactable with the shaft 2. Further, each conductor 14 is formed of a plurality or set 15 of conductive fibers 20 distributed circumferentially and arranged to extend radially inwardly from the retainer inner end 12a, each fiber 20 preferably being formed of carbon. The plurality/set 15 of conductive fibers 20 provide paths for electric charge or current to pass from the rotating shaft 2, through the plurality of fibers 20 and to the retainer 12, to thereafter flow to the housing 3 as described below. Thereby, the conductive assembly 10 functions as a grounding device to prevent current or charge from passing through the bearing 1, which may damage the bearing raceways (not indicated).

The at least two and preferably several conductors 14, most preferably eight conductors 14 as depicted, are spaced apart circumferentially about the centerline $L_C$ so as to define at least two and preferably several axial passages 22 between the retainer 12 and the shaft 2. That is, a separate passage 22 is defined between each pair of adjacent, but spaced apart, conductors 14. By forming the conductive assembly 10 with a plurality of separate or discrete conductors 14 separated by passages 22, the amount of friction and heat generated during use is substantially reduced in comparison with previously known devices having a continuous conductor, i.e., having fibers extending about the entire inner circumference. Additionally, the passages 22 permit the unhindered flow of fluids, particularly lubricants and air, to and from the bearing 1 through the assembly 10.

As discussed above, the conductive assembly 10 preferably comprises at least two spacers 16, specifically the same number of spacers 16 as the number of conductors 14. Each spacer 16 is preferably arcuate shaped and disposed between two of the conductors 14, so as to circumferentially separate or space apart the two conductors 14, and has a radial outer end 16a disposed within the retainer groove 13 and an opposing radial inner end 16b. The inner end 16b of each spacer 16 is spaced radially outwardly from the shaft outer surface 2a such that one of the axial passages 22 is defined radially between the spacer inner end 16b and the shaft 2. Preferably, each one of the spacers 16 is formed of a plurality or set 17 of conductive fibers 24 distributed circumferentially and which are identically formed as the conductive fibers 20 of the conductors 14, with the exception of the fiber radial lengths as described in detail below.

Specifically, at least two sets 15 of the first conductive fibers 20 and at least two sets 17 of the second conductive fibers 24 are spaced alternately and circumferentially about the retainer centerline $L_C$ such that each set 17 of the second conductive fibers 24 (providing the spacers 16) is disposed between two sets 15 of the first conductive fibers 20 (forming the conductors 14). However, the spacers 16 may be formed in any other appropriate manner, such for example, as arcuate solid members each formed of a metallic material or even non-metallic material, capable of separating two conductors 14 and sized to provide the axial passages 22.

With each conductor 14 being formed of a set 15 of first conductive fibers 20 and each spacer 16 being formed of a set 17 of second conductive fibers 24, the conductive assembly 10 preferably further comprises a circular hoop 30 disposed within the retainer 12, as shown in FIGS. 4, 5, 7 and 8. The hoop 30 is preferably formed of a length (not indicated) of conductive wire 31 (FIG. 7) bended into a circular or annular shape, as described below. With such a hoop 30, each conductive fiber 20, 24 of each conductor 14 and each spacer 16 has two opposing ends 20a, 20b and 24a, 24b, respectively, and is bended about the hoop 30 such that the two ends 20a, 20b and 24a, 24b of each fiber 20, 24, respectively, are disposed at the inner radial end 14b, 16b of the conductor 14 or spacer 16.

Specifically, each conductive fiber 20 or 24 is generally U-shaped or V-shaped and has first and second legs 20c, 20d or 24c, 24d and a central bight 20e, 24e. The fibers 20, 24 are arranged such that the bight 20e, 24e is located on an outer surface 30a of the hoop 30 and the two legs 20c, 20d or 24c, 24d extend radially inwardly. As such, each fiber 20 of the conductors 14 provides two conductive legs 20c, 20d and the radial extent or length $r_C$, $r_S$ of each fiber 20 or 24 is half the fiber overall linear length. Although preferably bended into a U or V shape as discussed above, the fibers 20 or/and 24 may be arranged to extend radially in a generally straight line from one end 20a, 24a at the radial outer end 14a, 16a to the other end 20b, 24b at the radial inner end 14b, 16b.

Figure 10A:
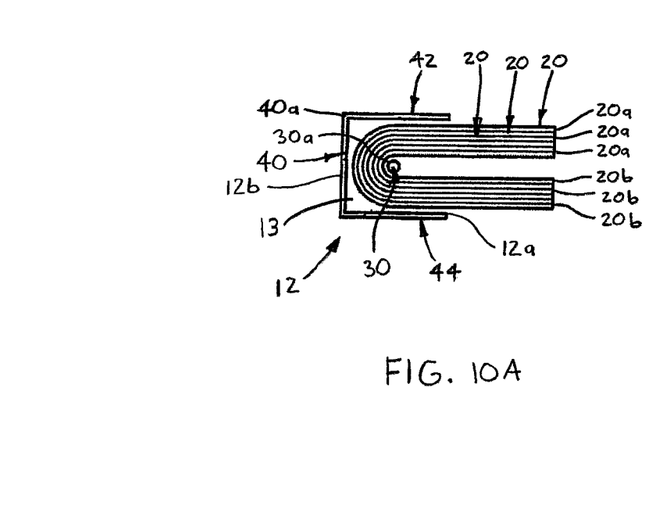
Figure 10B:
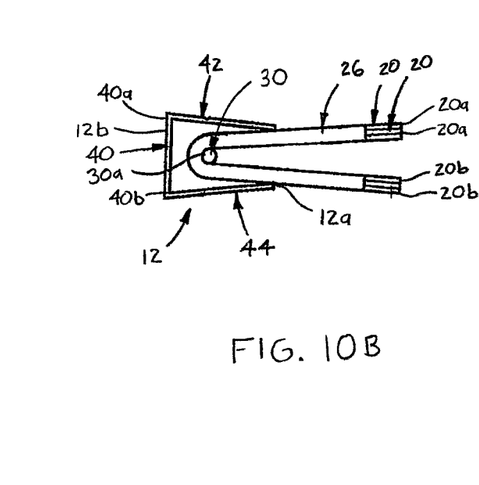

Further, each conductive fiber 20, 24 is preferably formed of carbon but may alternatively be fabricated of any appropriate electrically conductive material, such as a metallic material, a conductive polymer, etc. Preferably, each conductive fiber 20, 24 is sized having a diameter within the range of five micrometers or microns (5 μm) to one hundred microns (100 μm). Furthermore, the conductive fibers 20 and 24 may be arranged as individual fibers (e.g., as shown in FIG. 10A) or may be clustered into subsets 26 of multiple fibers 20 or 24 sheathed by a polymeric material, as depicted in FIG. 10B. Such polymer-sheathed subsets 26 make the fibers 20, 24 easier to handle and install in the retainer 12 and reduce the likelihood of breakage.

As described above, the conductive fibers 20 and 24 are formed substantially identically to each other with the exception of the radial length. Specifically, each conductive fiber 24 of the spacers 16 has a radial length $r_S$ substantially lesser than a radial length $r_C$ of each conductive fiber 20 of each conductor 14, as indicated in FIGS. 4 and 5. The shorter length $r_S$ of the spacer fibers 24 enable the spacers 16 to partially define (i.e., radially) the passages 22 between the radial inner end 16b of each one of the spacers 16, defined by all of the ends 24a, 24b of the conductive fibers 24 in each spacer 16, and the shaft outer surface 2a. The purpose for forming the fibers 20, 24 generally identically and for fabricating the spacers 16 of a plurality of the conductive fibers 24 is due to the preferred manufacturing method of the conductive assembly 10, as described in detail below.

Referring to FIGS. 4, 5 and 9-11, the retainer 12 preferably includes an outer axial base portion 40 having two ends 40a, 40b and two radial leg portions 42, 44 each extending radially inwardly from a separate end 40a, 40b of the base portion 40. The base portion 40 and the leg portions 42, 44 define the retainer annular groove 13, with the leg portions 42, 44 functioning to retain the hoop 30 and the inner radial ends 14a, 16a of the conductors 14 and the spacers 16, respectively, disposed within the retainer groove 13. That is, the retainer leg portions 42, 44 clamp against the sides of the fibers 20 and 24, such the hoop 30, the bights 20e, 24e and the upper ends of the two legs 20c/20d, 24c/24d are prevented from falling radially inwardly from the groove 13. However, depending on the specific structure of the conductors 14 and the spacers 16, the annular retainer 12 may have any other appropriate shape and/or structure necessary to retain the components 14, 16 and provide an electrically conductive path between the conductors 14 and the bearing outer ring 5 and/or the housing 3.

Referring now to FIGS. 1 and 6-8, as discussed above, the conductive assembly 10 preferably includes an outer annular case 18 connectable with the bearing outer ring 5 or the bearing housing 3 and configured to support the retainer 12 about the shaft 2. Preferably, the case 18 includes an L-shaped annular body 50 formed of a conductive material such as aluminum, steel, copper, etc. and having an outer axial portion 52 and a radial portion 54 extending radially inwardly from the axial portion 52. The axial portion 52 has opposing inner and outer circumferential surfaces 53A, 53B, respectively, and opposing axial ends 52a, 52b. The radial portion 54 has an outer radial end 54a integrally formed with one end 52b of the axial portion 52, an inner radial end 54b defining a central opening 56 and a plurality of mounting tabs 58 spaced circumferentially about a central section 54c.

Figure 1:
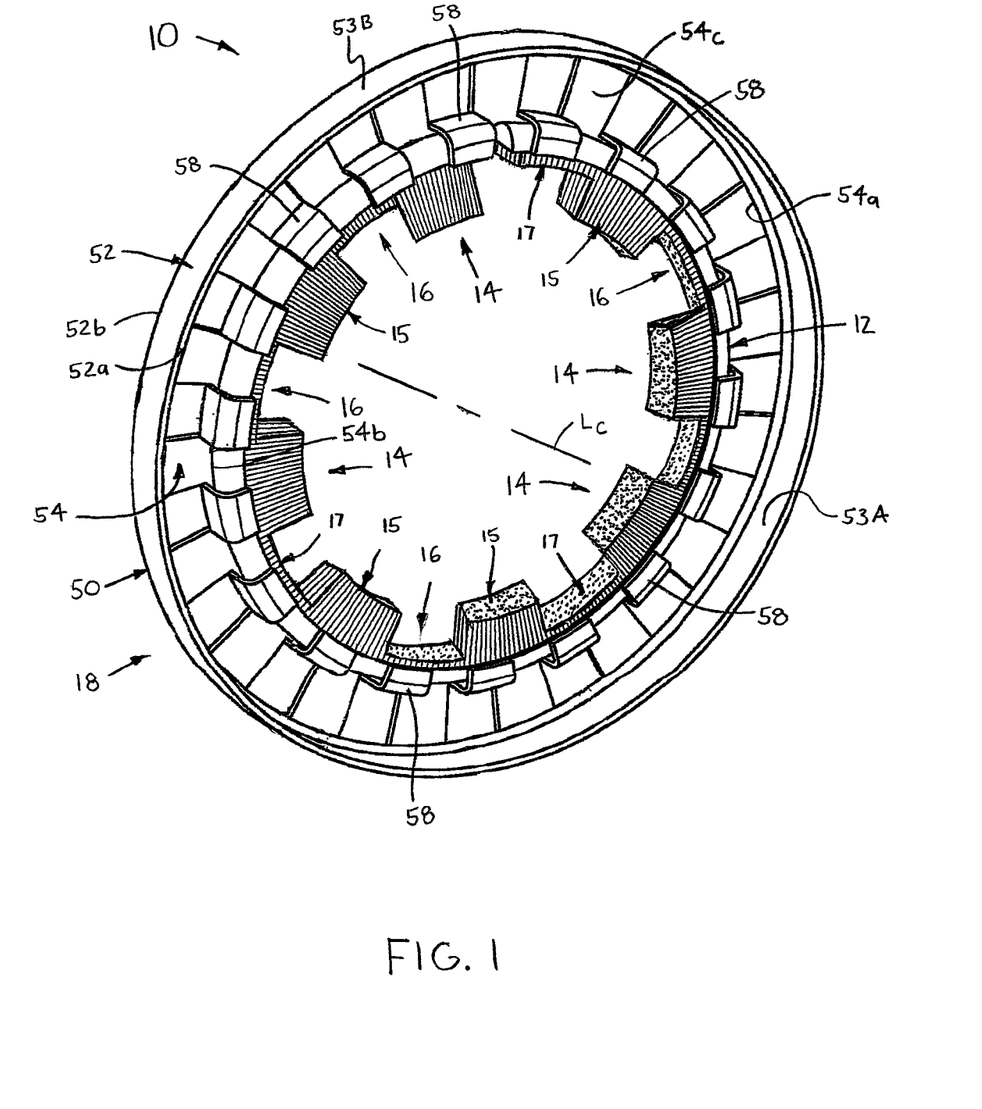
FIG. 1 is a perspective view of a conductive assembly in accordance with the present invention.
Figure 2:
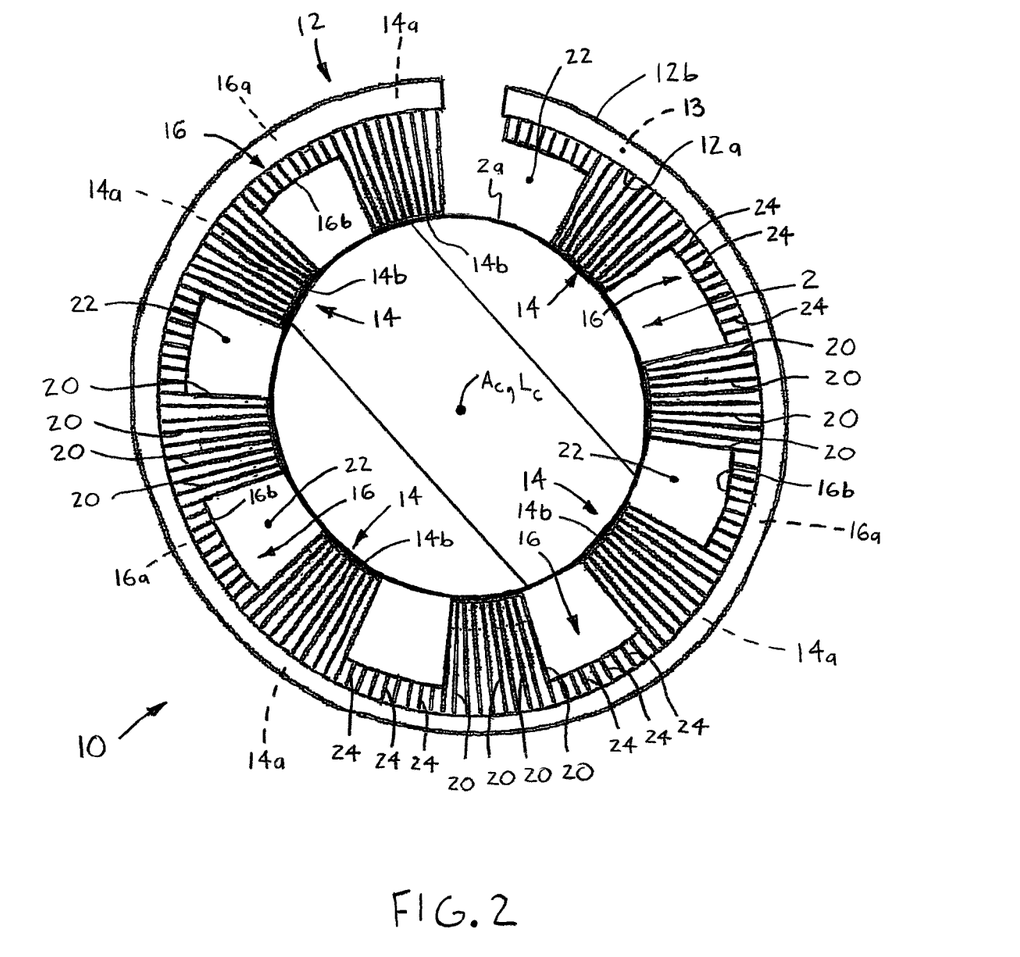
FIG. 2 is front view of the conductive assembly, shown without a case and engaged with a shaft shown in radial cross-section.
Figure 3:
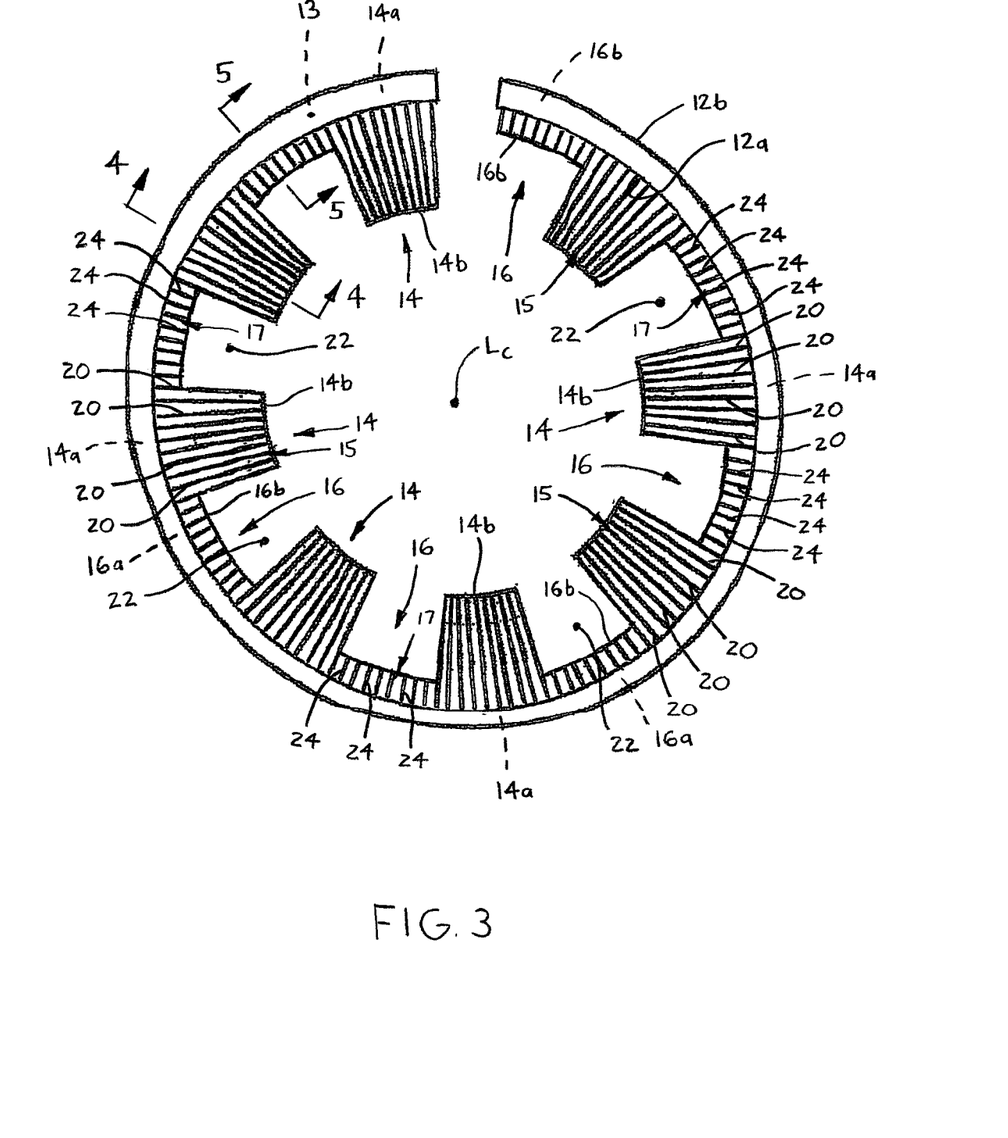
FIG. 3 is a front view of the conductive assembly separate from the case.

The mounting tabs 58 are engageable with the annular retainer 12 to connect the retainer 12 with the case 18, as best shown in FIG. 1.

Further, the case 18 may be connected with the bearing outer ring 5 by inserting the free end 52a of the axial portion 52 over an end of the bearing outer ring 5 to frictionally engage the inner surface 53A of the axial portion 52 with an outer surface 5a of the outer ring 5, as shown in FIG. 6. Alternatively, the case 18 may be coupled with the housing 3 by frictionally engaging the axial portion outer surface 53B with a housing inner surface 3a, as depicted in FIG. 7. As a further alternative shown in FIG. 8, the case 18 may be coupled with an end 3b of the housing 3 by frictionally engaging the axial portion inner surface 53A with an outer surface 3c of the housing 3. Although the case 18 is preferably constructed as described above, the case 18 may formed in any appropriate manner that enables the case 18 to couple the retainer 12 with the bearing outer ring 5 or the housing 3. Alternatively, the conductive assembly 10 may be fabricated without any case and with the retainer 12 being formed to directly mount to the bearing outer ring 5 or to the housing 3.

Figure 9:
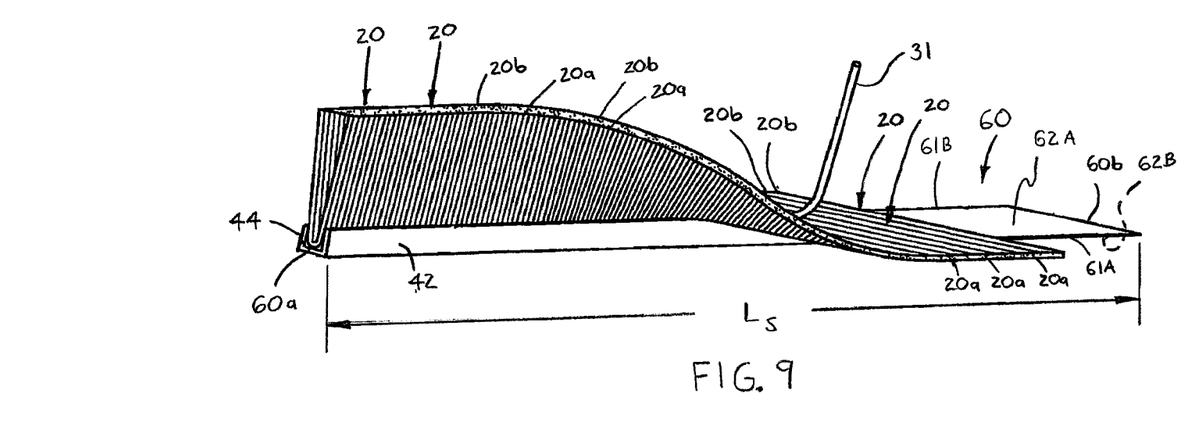
FIG. 9 is a perspective view of plurality of conductive fibers and a wire each disposed on a metal strip during formation of the conductive assembly.

Referring now to FIGS. 9-12, as mentioned above, the preferred structures of the retainer 12, the conductors 14 and the spacers 16 are a result of the preferred method of manufacturing these components. More specifically, the conductors 14, the spacers 16 and the retainer 12 are preferably formed by first providing a large plurality or number of the first conductive fibers 20, a strand of the metal wire 31 having a length (not indicated) which will provide the desired circular perimeter of the hoop 30, and a flat, elongated rectangular strip 60. The strip 60 has opposing primary surfaces 62A, 62B, opposing ends 60a, 60b, two longitudinal edges 61A, 61B extending between the ends 60a, 60b and a length Ls determined to form a desired perimeter of the retainer 12. Then, the number of fibers 20 are positioned on one surface 62A or 62B of the strip 60 such that the ends 20a, 20b of each fiber 20 extends beyond the edges 62A, 62B, respectively, of the strip 60, and the fibers 20 are distributed along the length Ls of the strip 60. Next, the wire 31 is placed centrally upon the fibers 20 so as to extend along the length Ls of the strip 60 and then each one of the two longitudinal edges 61A, 61B of the strip 60 are bended toward the other longitudinal edge 61B, 61A so as to form the two spaced apart leg portions 42, 44, the base portion 40, and the groove 13 of the retainer 12, as best shown in FIG. 9. The bending of the strip edges 62A, 62B causes the fibers 20 to bend about the wire 31 such that the two ends 20a, 20b of each fiber 20 are adjacent to each other and extend outwardly from the retainer groove 13, while the retainer leg portions 42, 44 keep the fibers 20 and the wire 31 disposed within the groove 13.

Figure 11:
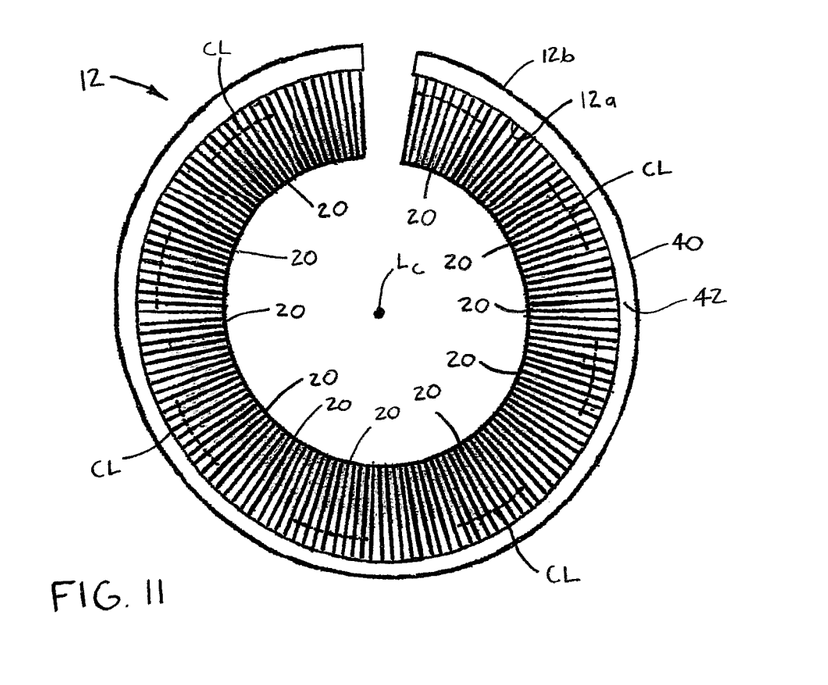
FIG. 11 is front view of a formed retainer and conductive fibers prior to forming passages.
Figure 12:
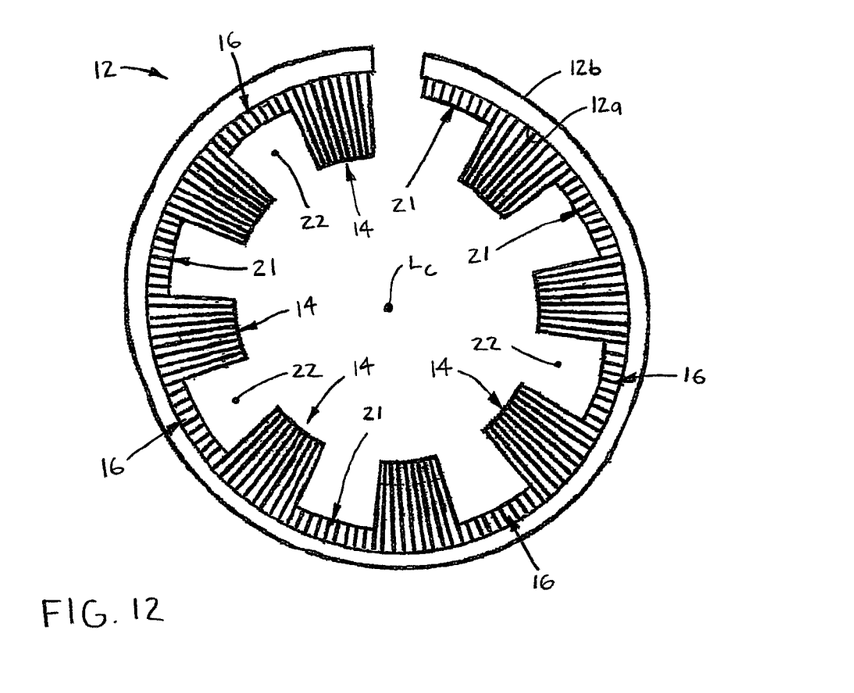
FIG. 12 is another front view of the formed retainer and conductive fibers after formation of the passages.

Then, the strip 60 and the retained wire 31 are formed or bended into annular bodies 12, 30 about the centerline $L_C$ such the number of fibers 20 extend radially inwardly toward the centerline $L_C$, as shown in FIG. 11. At this point, the retainer 12 and the conductive fibers 20 may be positioned within the case 18 and utilized as a prior art conductive assembly. However, to form the conductive assembly 10 of the present invention, a plurality of separate portions 21 (indicated in FIG. 12) of the fibers 20 are then cut, preferably by a die cutting operation along cut lines CL (FIG. 11), such that the fibers of each cut portion 21 are reduced to the second radial length $r_S$. Thus, each one of the second conductive fibers 24 is fabricated from one first conductive fiber 20. Each cut portion 21 of the fibers 20 defines a separate axial passage 22 when the conductive assembly 10 is disposed about a shaft 2, i.e., between the radial inner end 21a of each cut portion 21 and the shaft outer surface 2a.

Although preferably fabricated as discussed above, the conductive assembly 10 of the present invention may be fabricated in any other appropriate manner. For example, each conductor 14 may be formed into an arcuate set or body of conductive fibers 20 that is then assembled separately into the retainer 12, with solid spacers 16 or no spacers in the retainer 12 to define the passages 22. The scope of the present invention encompasses all methods capable of forming the conductive assembly 10 having the basic structure as discussed above.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Moreover, combinations of features and steps disclosed in the above detailed description may not be necessary to practice the invention in the broadest sense and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. The invention is not restricted to the above-described embodiments and may be varied within the scope of the following claims.

We claim:

1. An electrically conductive assembly for a bearing disposed about a shaft and disposed within a housing, the bearing including inner and outer rings and plurality of rolling elements disposed between the rings, the conductive assembly comprising:
    an annular retainer coupleable with the bearing outer ring or with the bearing housing and having a centerline and an open inner end defining an annular groove;
    at least two conductors each having a radially outer end disposed within the retainer groove and a radially inner end contactable with the shaft, each conductor being formed of a plurality of conductive fibers arranged to extend radially inwardly from the retainer inner end, the at least two conductors being spaced apart circumferentially about the centerline so as to define at least two axial passages between the retainer and the shaft; and
    at least two spacers, each spacer being disposed between a respective two of the at least two conductors and having a radial outer end disposed within the retainer and a radial inner end spaced outwardly from the shaft such that one of the axial passages is defined between the spacer inner end and the shaft.

2. The conductive assembly as recited in claim 1 wherein each one of the spacers is formed of a plurality of conductive fibers, each conductive fiber of each spacer having a radial length substantially lesser than a radial length of each conductive fiber of each conductor.

3. The conductive assembly as recited in claim 1 further comprising a circular hoop disposed within the retainer and wherein each conductive fiber of each conductor has two opposing ends and is bent about the hoop such that the two ends of each fiber are disposed at the conductor inner radial end.

4. The conductive assembly as recited in claim 3 wherein each conductive fiber of each conductor has a first radial length between the two ends of the fiber and further comprising at least two spacers, each spacer being disposed between two of the at least two conductors and including a plurality of the conductive fibers, each spacer conductive fiber having two ends and a second radial length between the two ends and being bent about the hoop such that each of the two ends is located at a spacer radial inner end, the second radial length of each spacer conductive fiber being substantially lesser than the first radial length of each conductor conductive fiber such that a separate one of the at least two axial passages is partially defined between the radial inner end of each one of the spacers and the shaft outer surface.

5. The conductive assembly as recited in claim 1 wherein each one of the at least two axial passages permits lubricant flow through the conductive assembly.

6. The conductive assembly as recited in claim 1 further comprising an outer annular case connectable with the bearing outer ring or the bearing housing and configured to support the retainer about the shaft.

7. The conductive assembly as recited in claim 6 wherein the case includes an outer axial portion and a radial portion extending inwardly from an end of the axial portion, the radial portion having a plurality of mounting tabs engageable with the annular retainer to connect the retainer with the case.

8. The conductive assembly as recited in claim 1 wherein the retainer includes an outer axial base portion having two ends and two radial leg portions each extending radially inwardly from a separate end of the base portion, the base portion and the leg portions defining the annular groove.

9. An electrically conductive assembly for a bearing disposed about a shaft and disposed within a housing, the bearing including inner and outer rings and plurality of rolling elements disposed between the rings, the conductive assembly comprising:
    an annular retainer coupleable with the bearing outer ring or with the bearing housing and having a centerline and an open inner end defining an annular groove; and
    at least two sets of first conductive fibers and two sets of second conductive fibers spaced alternately and circumferentially about the retainer centerline such that each set of the second conductive fibers is disposed between a respective two of the sets of the first conductive fibers, each first conductive fiber extending radially inwardly from the retainer groove, having a first radial length and being contactable with the shaft outer surface and each second conductive fiber extending radially inwardly from the retainer groove and having a second radial length substantially lesser than the first radial length such that an arcuate axial passage is defined radially between each one of the sets of the second fibers and the shaft outer surface.

10. The conductive assembly as recited in claim 9 wherein each one of the second conductive fibers is formed by cutting a fiber having the first length to reduce the length of the fiber to the second length.

11. The conductive assembly as recited in claim 9 wherein each one of the axial passages is located circumferentially between a respective two of the sets of the first conductive fibers.

12. The conductive assembly as recited in claim 9 wherein:
the conductive assembly further comprises a circular hoop disposed within the retainer annular groove; and
each one of the first conductive fibers and each one of the second conductive fibers has two opposing ends and is bent about the hoop such that the two ends are located radially inwardly of the retainer.

13. The conductive assembly as recited in claim 9 wherein the at least two conductors includes eight conductors and the at least two passages includes eight passages.

14. The conductive assembly as recited in claim 9 further comprising an outer annular case connectable with the bearing outer ring or the bearing housing and configured to support the retainer.

15. The conductive assembly as recited in claim 14 wherein the case includes an outer axial portion and a radial portion extending inwardly from an end of the axial portion, the radial portion having a plurality of mounting tabs engageable with the annular retainer to connect the retainer with the case.

16. The conductive assembly as recited in claim 9 wherein the retainer includes an outer axial base portion having two ends and two radial leg portions each extending radially inwardly from a separate end of the base portion, the base portion and the leg portions defining the annular groove.

17. A method of forming a conductive assembly for a bearing disposed about a shaft and disposed within a housing, the method comprising the steps of:
providing a plurality of conductive fibers each having opposing ends and a first length between the ends, a length of metal wire, and an elongated rectangular strip of metallic material having a length, an upper surface and two longitudinal edges;
positioning the plurality of conductive fibers upon the upper surface of the strip such that the ends of each fiber extend outwardly of the edges of the strip and the plurality of fibers is distributed along the length of the strip;
placing the wire upon the distributed plurality of conductive fibers such that wire extends centrally along the length of the strip;
bending each one of the two longitudinal edges of the metal strip toward the other longitudinal edge so as to form two spaced apart legs, the two legs defining a groove and retaining the wire and plurality of fibers within the groove, and to cause each one of the conductive fibers to bend about the wire such that the two ends of each fiber are adjacent to each other;
forming the strip and the wire into an annular body with a centerline such the plurality of fibers extend radially toward a centerline; and
cutting all of the fibers within each one of a plurality of separate portions of the fibers IQ as to provide a plurality of cut portions of the fibers, the fibers of each cut portion having a second length lesser than the first length, each cut portion of the fibers defining a separate axial passage when the annular body is disposed about a shaft.

18. The method of claim 17 further comprising the steps of:
providing a case connectable with a bearing outer ring or with a bearing housing; and
coupling the annular body with the case.

19. An electrically conductive assembly for a bearing disposed about a shaft and disposed within a housing, the bearing including inner and outer rings and plurality of rolling elements disposed between the rings, the conductive assembly comprising:
an annular retainer coupleable with the bearing outer ring or with the bearing housing and having a centerline and an open inner end defining an annular groove;
at least two conductors each having a radially outer end disposed within the retainer groove and a radially inner end contactable with the shaft, each conductor being formed of a plurality of conductive fibers arranged to extend radially inwardly from the retainer inner end, the at least two conductors being spaced apart circumferentially about the centerline so as to define at least two axial passages between the retainer and the shaft; and
a circular hoop disposed within the retainer and wherein each conductive fiber of each conductor has two opposing ends and is bent about the hoop such that the two ends of each fiber are disposed at the conductor inner radial end.

* * * * *